(12) United States Patent
Desmond et al.

(10) Patent No.: US 11,809,375 B2
(45) Date of Patent: Nov. 7, 2023

(54) MULTI-DIMENSIONAL DATA LABELING

(71) Applicant: International Business Machines Corporation, Armonk, NY (US)

(72) Inventors: Michael Desmond, White Plains, NY (US); Evelyn Duesterwald, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 17/368,338

(22) Filed: Jul. 6, 2021

(65) Prior Publication Data

US 2023/0009237 A1    Jan. 12, 2023

(51) Int. Cl.
*A61N 1/00* (2006.01)
*G06F 16/16* (2019.01)
*G06N 5/04* (2023.01)
*G06N 20/00* (2019.01)

(52) U.S. Cl.
CPC ............. *G06F 16/164* (2019.01); *G06N 5/04* (2013.01); *G06N 20/00* (2019.01)

(58) Field of Classification Search
CPC ......... G06F 16/164; G06N 20/00; G06N 5/04
USPC .................................................. 707/600–899
See application file for complete search history.

(56) References Cited

U.S. PATENT DOCUMENTS

| | | | |
|---|---|---|---|
| 8,577,143 B2 | 11/2013 | Sullender | |
| 10,552,762 B2 | 2/2020 | Firooz | |
| 2008/0205724 A1 | 8/2008 | Cocosco | |
| 2018/0300576 A1 | 10/2018 | Dalyac | |
| 2020/0142902 A1 | 5/2020 | Ross | |
| 2020/0210854 A1 | 7/2020 | Srinivasan | |
| 2021/0004388 A1* | 1/2021 | Starr | .................. H04L 67/1097 |

FOREIGN PATENT DOCUMENTS

| | | |
|---|---|---|
| CN | 110955690 A | 4/2020 |
| KR | 102096386 B1 | 4/2020 |

OTHER PUBLICATIONS

An overview of weak supervision. Snorkel. (n.d.). Retrieved for Apr. 14, 2021 via web.archive.org for https://www.snorkel.org/blog/weak-supervision, (pp. 1-12).
Slice-based learning. • Snorkel. (n.d.). Retrieved for Jun. 23, 2021 via web.archive.org for https://www.snorkel.org/blog/slicing, (pp. 1-7).

(Continued)

*Primary Examiner* — Isaac M Woo
(74) *Attorney, Agent, or Firm* — Caleb Wilkes; Otterstedt & Kammer PLLC

(57) ABSTRACT

Methods and systems for multi-dimensional data labeling. A structured data set having a plurality of rows is obtained, the structured data set comprising a set of data attributes, each data attribute having a data value for each of the plurality of rows of the structured data set. The structured data set is decomposed into a plurality of dimensions, each dimension defining a proper subset of the data attributes based on coherence criterion. A dimension label is obtained for each dimension of at least a portion of the plurality of rows of the structured data set and the dimension labels for a given one of the rows of the structured data set are consolidated into at least one row label for the given one of the rows.

20 Claims, 11 Drawing Sheets

(56) References Cited

OTHER PUBLICATIONS

Peter Mell and Timothy Grance, The NIST Definition of Cloud Computing, NIST Special Publication 800-145, Sep. 2011, cover, pp. i-iii and 1-3.
Wikimedia Foundation. Aspect-oriented programming. Wikipedia. Retrieved for Jun. 26, 2021 via web.archive.org for https://en.wikipedia.org/wiki/Aspect-oriented_programming, (pp. 1-20).
Tarr P, Ossher H. Hyper/J user and installation manual. IBM research; 2000. (pp. 1-60).

* cited by examiner

| User | Card | Year | Month | Day | Time | Amount | Use_Chip | Merchant_Name | Merchant_City | Merchant_State |
|---|---|---|---|---|---|---|---|---|---|---|
| 239 | 7 | 2016 | 10 | 18 | 17:25 | $48.72 | Swipe Transaction | Restaurant 1 | Indianapolis | IN |
| 301 | 1 | 2019 | 11 | 22 | 18:21 | $61.85 | Chip Transaction | Restaurant 2 | Cookeville | TN |
| 177 | 0 | 2016 | 12 | 5 | 15:57 | $115.28 | Chip Transaction | Car Service A | Saint Cloud | FL |
| 162 | 1 | 2013 | 9 | 22 | 7:30 | $449.95 | Online Transaction | Airline Company 16 | Online | |
| 398 | 1 | 2018 | 3 | 14 | 17:43 | $853.51 | Online Transaction | Travel Booking Company 2 | Online | |

| Zip | MCC | Is_Hold | Is_Flight | Year_1 | Month_1 | Day_1 | Flt1_Src_Air | Flt1_Dest_Air | Flt2_Src_Air | Flt2_Dest_Airport |
|---|---|---|---|---|---|---|---|---|---|---|
| 46236 | 5812 | 0 | 0 | | | | | | | |
| 38501 | 5812 | 0 | 0 | | | | | | | |
| 34771 | 4121 | 0 | 0 | | | | | | | |
| | 4511 | 0 | 1 | 2013 | 9 | 23 | CLT | IAH | IAH | CLT |
| | 4722 | 0 | 1 | 2018 | 3 | 18 | LAX | DCA | DCA | LAX |

*FIG. 1*

MULTI-DIMENSIONAL DATA LABELING

BACKGROUND

The present invention relates to the electrical, electronic and computer arts, and more specifically, to data labeling systems.

Data labeling is a phase in the machine learning process in which human labelers examine data examples and apply labels. The goal is to build a labeled data set which can then be used to train a machine learning model to automate a particular task of interest. In addition to supervised machine learning, other applications of data labeling include performance assessments of prediction or classification tasks; tagging, coding or categorizing data for other data processing applications; and the like. Data labeling is generally considered to be an expensive and tedious process. Structured/tabular/multi-faceted data, in which each data record or example is made of a potentially large number of fields of varying data type or modality (numerical, categorical, text, image, audio, and the like) is particularly difficult to label.

For the labeler or subject matter expert (SME) tasked with labeling the data, analyzing a large number of fields/attributes at once and making a single labeling decision is both difficult and inefficient. It means that the labeler needs to understand and remember various aspects of the data in parallel and come up with a final decision, balancing conflicting signals and varying expertise in different aspects of the data.

SUMMARY

Principles of the invention provide techniques for multi-dimensional data labeling. In one aspect, an exemplary method includes the operations of obtaining, using at least one hardware processor, a structured data set having a plurality of rows, the structured data set comprising a set of data attributes, each data attribute having a data value for each of the plurality of rows of the structured data set; decomposing the structured data set into a plurality of dimensions, each dimension defining a proper subset of the data attributes based on at least one coherence criterion; obtaining a dimension label for each dimension of at least a portion of the plurality of rows of the structured data set; and consolidating, using the at least one hardware processor, the dimension labels for a given one of the rows of the structured data set into at least one row label for the given one of the rows.

In one aspect, a computer program product for multi-dimensional data labeling comprises a computer readable storage medium having program instructions embodied therewith, the program instructions executable by a computer to cause the computer to obtain a structured data set having a plurality of rows, the structured data set comprising a set of data attributes, each data attribute having a data value for each of the plurality of rows of the structured data set; decompose the structured data set into a plurality of dimensions, each dimension defining a proper subset of the data attributes based on coherence criterion; obtain a dimension label for each dimension of at least a portion of the plurality of rows of the structured data set; and consolidate the dimension labels for a given one of the rows of the structured data set into at least one row label for the given one of the rows.

In one aspect, an apparatus comprises a memory and at least one processor, coupled to said memory, and operative to perform operations comprising obtaining a structured data set having a plurality of rows, the structured data set comprising a set of data attributes, each data attribute having a data value for each of the plurality of rows of the structured data set; decomposing the structured data set into a plurality of dimensions, each dimension defining a proper subset of the data attributes based on coherence criterion; obtaining a dimension label for each dimension of at least a portion of the plurality of rows of the structured data set; and consolidating the dimension labels for a given one of the rows of the structured data set into at least one row label for the given one of the rows.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

faster and more reliable computer-assisted labeling of large structured data sets, thus improving the technological process of training machine learning systems;

efficiently assessing the performance of a data classification or prediction system (whether or not based on machine learning), and other data tagging, coding or categorization tasks;

automatic generation of clusters of data attributes exhibiting coherence (dimensions) to partition complex labeling tasks into sets of less complex labeling subtasks;

a variety of label consolidation strategies (majority vote, weighted majority vote, consensus strategy, and the like) to consolidate the results of the labeling subtasks; and automatic propagation of labels to similar sets of data attributes.

These and other features and advantages of the present invention will become apparent from the following detailed description of illustrative embodiments thereof, which is to be read in connection with the accompanying drawings.

BRIEF DESCRIPTION OF THE DRAWINGS

FIG. 1 is an illustration of at least a portion of an example structured data set, in accordance with an example embodiment;

DETAILED DESCRIPTION

Figure 2:
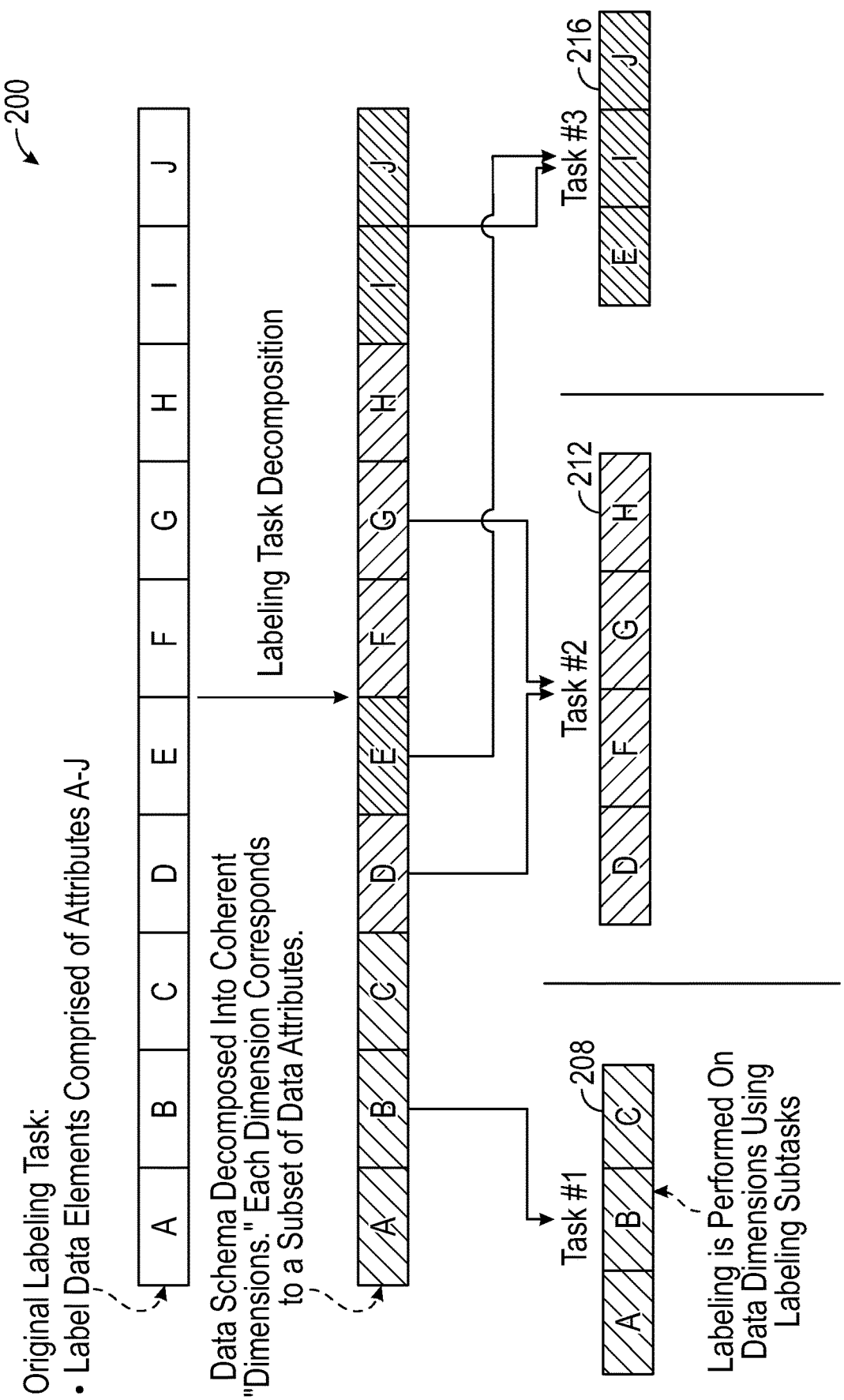
FIG. 2 is a representation of an example decomposition of a large structured data set into sets of coherent dimensions that can be labeled independently, in accordance with an example embodiment.

Generally, techniques for multi-dimensional data labeling are disclosed. A structured data labeling task with a large number of data attributes presents a number of fundamental challenges. Displaying a large number of data attributes in a coherent manner is practically challenging from an interface point of view. Furthermore, making a single decision based on such a large number of data points is mentally arduous and potentially unreliable. Multi-dimensional data labeling solves this problem from both a practical and process point of view by decomposing and distributing the labeling workload. Instead of having a single labeler consider all attributes at once, the labeling problem is decomposed into a set of subtasks via dimensional decomposition.

In one example embodiment, a structured data labeling task is decomposed into a multi-dimensional labeling flow. The original labeling task is decomposed into a set of labeling subtasks, based on a decomposition of data attributes into a set of coherent dimensions (groups of related data attributes). In one example embodiment, the decomposition is performed automatically and enhances the performance of the computer by generating a set of subtasks that are less complex than the original labeling task. In general, the derived subtasks are less complex than the original labeling task by virtue of being restricted to a related subgroup of data attributes. The derived subtasks may be assigned to human labelers based on their specific area(s) of expertise. In one or more embodiments, labeling decisions from subtasks are consolidated into a more robust final label using one of a set of consolidation strategies, which merge the decisions produced for each dimension.

In one example embodiment, the decomposition is implemented via an interactive information display, where a labeling task owner is presented with the available attributes, and can group attributes based on domain knowledge. In one example embodiment, the decomposition is assisted via attribute name/description clustering and/or attribute correlation analysis, in which coherent dimensions are discovered and recommended. In one example embodiment, the decomposition is automated via attribute name/description clustering and/or attribute correlation analysis. This process is implemented, for example, via semantic embedding of attribute information and clustering.

In general, each attribute or feature in a dataset has a name (attribute and feature are used interchangeably herein); the name is often descriptive of the content of the attribute. For instance, a customer record may have an 'education' attribute, or perhaps a 'job_title' attribute. Attributes may also have descriptions which explains their meanings. Given a set of attribute names and/or descriptions, a language model can be used to encode each attribute into a semantic representation, and then a clustering algorithm, such as Density-based Spatial Clustering of Applications with Noise (DB-SCAN), can be used to find coherency between attributes.

Correlation analysis refers to an analysis of how the values of different attributes correlate to one another. A correlation, such as that identified by the Pearson correlation coefficient (PCC) (also referred to as Pearson's r), indicates a dependence which can be used to cluster attributes into groups. A high correlation means that two or more variables have a strong relationship with each other, while a weak correlation means that the variables are barely related.

Dimensional decomposition produces simpler labeling tasks that can be assigned to labelers based on expertise, and limits potential biases. Multi-dimensional decomposition labeling is decomposed into multiple labeling subtasks, each with its own labelings. To compose the results of the sub-labeling tasks into a final labeling of the data, a label consolidation strategy (also referred to as a composition strategy herein) is used. Various strategies for label consolidation are utilized, such as majority vote, weighted majority vote, consensus strategy, and the like.

The majority vote strategy selects the majority label from the set of labels derived by the decomposed subtasks (the mean in a regression flow). The majority vote strategy has the side effect of providing a label weight, which can be used for subsequent model training or to find ambiguously labeled examples. The weight is calculated from the distribution of the labels from each labeling subtask for each data record. In one example embodiment, the weighting (also referred to as importance herein) is defined by a practitioner and applied to groups of attributes and/or labeling subtasks. For example, the labels derived from one subtask can be weighted over labels derived from another subtask based, for example, on the attributes considered by the corresponding subtask. The weight of each dimension is taken into account when consolidating a final label and a corresponding confidence score.

The weighted majority vote is the same as the majority vote, but it takes into account an importance weight applied to the dimensions of the data. This weighting can be applied to the final label calculation and the labeling weighting. The consensus strategy can be used in scenarios where correctness of the label is important. In this case, a label is only applied to an example if there is a consensus across all of the labeling subtasks.

FIG. 1 is an illustration of at least a portion of an example structured data set 100, in accordance with an example embodiment. The example data set of FIG. 1 includes 22 attribute columns (only 5 rows of data are shown to avoid clutter, but many more rows of data could be present). Enterprise data, scientific data, and the like often includes structured tables or comma separated values (CSVs) with tens or even hundreds of columns. Manually labeling a row of data with ten or more columns is very challenging and error-prone. The labeler typically cannot view the entire row with all its columns of data at the same time. Moreover, a human cannot typically simultaneously consider more than a few data values at a time. As a result, labeling is very time consuming and/or a labeler may simply ignore parts of the data columns leading to poor labeling quality.

In one example embodiment, large structured data sets (with a large number of columns) are decomposed into sets of coherent dimensions that can be labeled independently. The decomposition is constructed using one of several decomposition strategies. Labels are then obtained for each dimension and each row. In one example embodiment, a plurality of labels are generated for at least one of the dimensions. The labels obtained for each dimension in a row are consolidated into a label decision for the entire data row. The consolidated row label is obtained using one of several merge functions, such as a majority vote. In one example embodiment, the consolidation operation produces a plurality of labels for the row using one or more consolidation strategies and based on one or more labels per dimension. The disclosed technique facilitates faster and more reliable computer-assisted labeling of large structured data sets, which enhances the technological process of training machine learning systems.

FIG. 2 is a representation of an example decomposition of a large structured data set 200 into sets of coherent dimensions that can be labeled independently, in accordance with an example embodiment. The data set 200 includes data elements including attributes A-J. The goal of decomposition is to create a set of smaller derived labeling subtasks that can be manually labeled more efficiently (thus, faster) and more effectively (thus, more accurate). It is noted that automatic labeling is also contemplated in some instances. In some non-limiting cases, only duplicates are automatically labeled (the likelihood of same increases when data is decomposed into sub dimensions). A decomposition strategy creates multiple dimensions (groups of attributes) from a large set of attributes; each dimension defines a derived labeling subtask. In general, the data attributes that have similar characteristics or are otherwise related in terms of labeling are segmented into different dimensions. For example, a first dimension 208 includes attributes A, B and C; a second dimension 212 includes attributes D, F, G, and H; and a third dimension 216 includes attributes E, I, and J. A first subtask (Task #1) then labels the first dimension 208, a second subtask (Task #2) labels the second dimension 212, and a third subtask (Task #3) labels the third dimension 216.

In one example embodiment, a task owner defines groups of coherent attributes using her or his domain or labeler expertise. In one example embodiment, the decomposition is automated or computer-assisted, where an attribute correlation analysis (or attribute name/description analysis) is performed and attribute names and descriptions are clustered into related groups. Various correlation techniques, such as the PCC, may be used. In general, a high correlation means that two or more variables have a strong relationship with each other while a weak correlation means that the variables are barely related.

Returning to FIG. 1, there are a number of difficulties in making a labeling decision for each row of the structured data set 100. For example, display challenges include the keyhole problem where only a portion of the data may be viewed at a time. In addition, human factors include information overload, memory retention, and the like.

Figure 3:
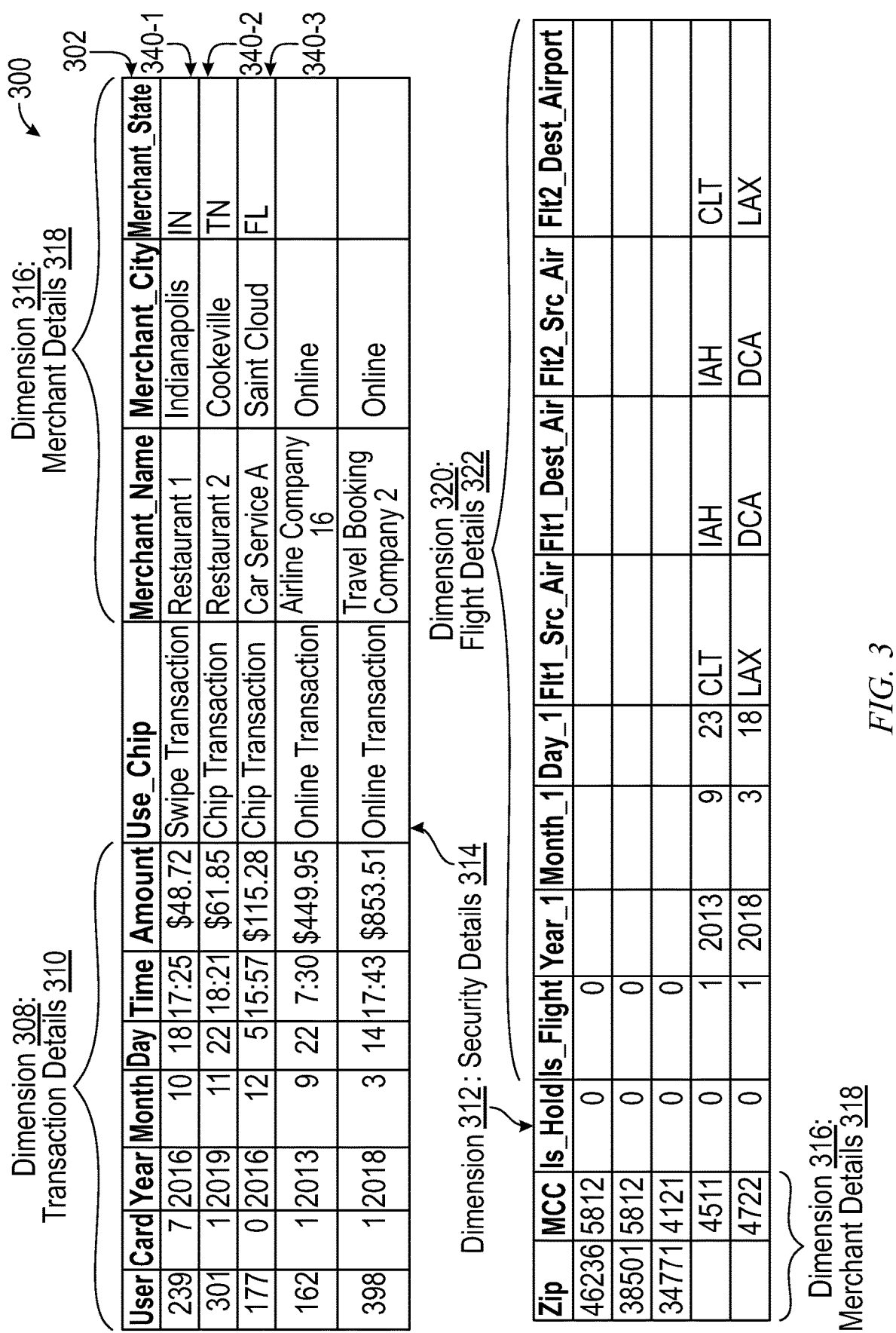
FIG. 3 is an illustration of the clustering of the data attributes of the structured data set of FIG. 1 into coherent dimensions, in accordance with an example embodiment.

FIG. 3 is an illustration of the clustering 300 of the data attributes 302 of the structured data set 100 of FIG. 1 into coherent dimensions, in accordance with an example embodiment. Each dimension corresponds to its own derived labeling task. As illustrated in FIG. 3, the dimensions include a transaction details dimension 308, a security details dimension 312, a merchant dimension 316, and a flight dimension 320. The transaction details dimension 308 includes 7 data attributes 302 (User, Card, Year, Month, Day, Time, and Amount), the security details dimension 312 includes 2 data attributes 302 (Use_Chip and Is_Hold), the merchant dimension 316 includes 5 data attributes 302 (Merchant_Name, Merchant_City, Merchant_State, Zip, and MCC), and the flight dimension 320 includes 8 data attributes 302 (Is_Flight, Year_1, Month_1, Day_1, Flt1_Src_Airp, Flt1_Dest_Airp, Flt2_Src_Airp, and Flt2_Dest_Airp).

Following the decomposition task, each derived labeling subtask is performed to label each dimension 308, 312, 316, 320 independently. Each derived labeling subtask utilizes multiple possible labels even if the original problem was a single label problem. The labeling may be performed by a human, performed by a computer or be computer-assisted.

In one example embodiment, automatic label propagation is performed. In general, the result of the labeling task decomposition is likely to produce subtasks that have nearly identical values. Instead of repeatedly prompting the human labeler with (nearly) identical labeling subtasks, automated label propagation only prompts the human labeler with unique subtasks and automatically propagates the obtained labels to all (nearly) identical subtasks. Thus, for example, a label for one row 340-1, 340-2, 340-3 of a data structure 100 is automatically propagated to other rows 340-1, 340-2, 340-3 of a data structure 100 that have nearly identical data values.

It is worth noting that in some instances, every row has one label column; generally, labels only are propagated (not values in dimensions). Thus, in some embodiments, conceptually, labels can only be propagated across rows. Further, in some instances, it is not intended for labels to propagate amongst dimensions; propagation only happens within a particular dimension, due to the increased possibility of duplicate or near duplicate examples, due to the reduction of number of attributes.

Figure 4:
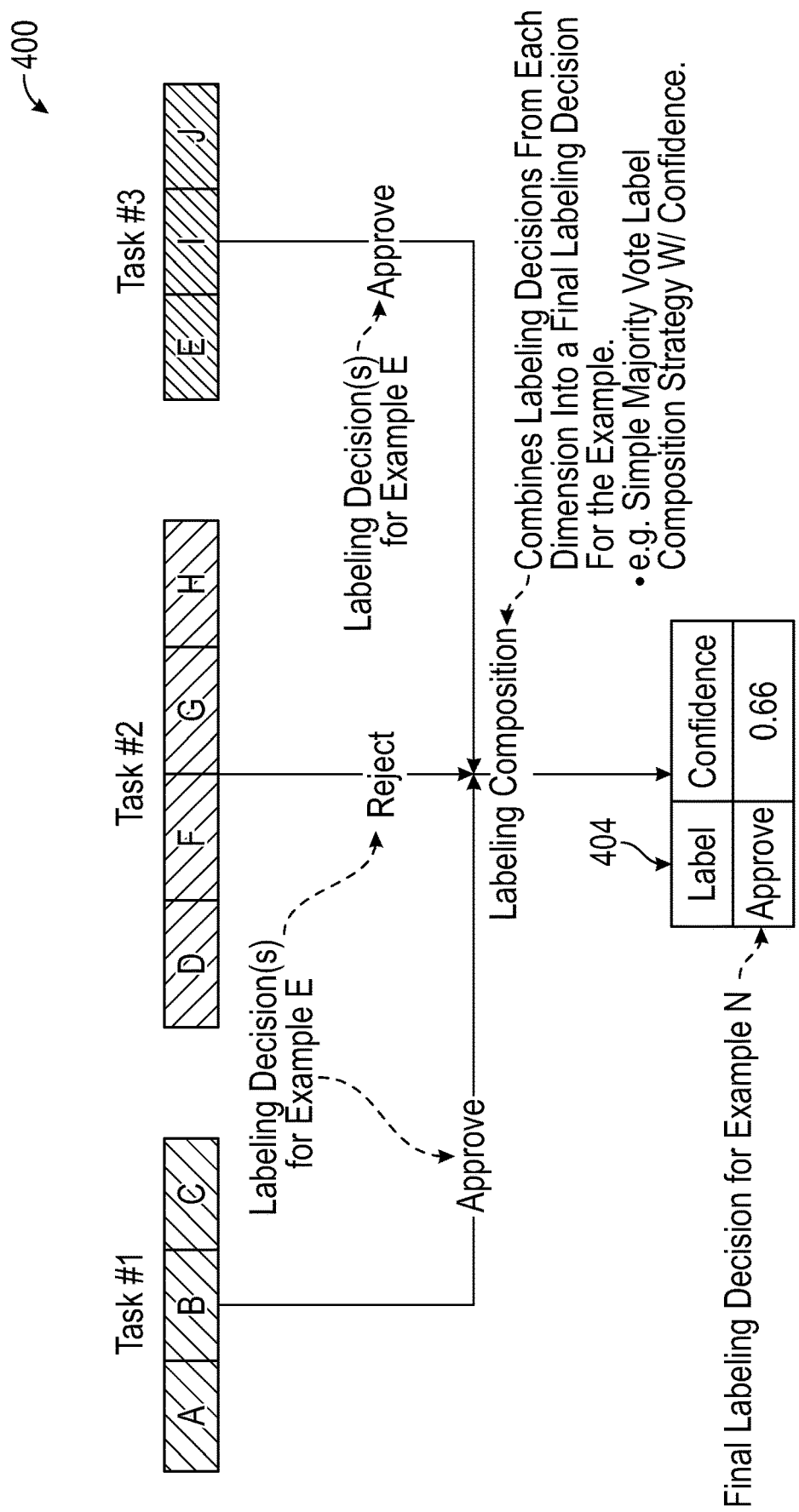
FIG. 4 is an illustration of an example consolidation of labels from corresponding labeling subtasks, in accordance with an example embodiment.

Following the performance of the derived label subtasks, label consolidation and composition is performed to derive a single label from the labels derived by each labeling subtask. FIG. 4 is an illustration 400 of an example consolidation of labels from corresponding labeling subtasks, in accordance with an example embodiment. As illustrated in FIG. 4, the label "approve" was generated by Task #1 for data attributes 302 A, B, C; the label "reject" was generated by Task #2 for data attributes 302 D, F, G, H; and the label "approve" was generated by Task #3 for data attributes 302 E, I, J. Labeling composition is performed to generate a single label using one of a plurality of label composition techniques. For example, the illustration of FIG. 4 utilizes a simple majority vote label composition strategy with confidence. In one example embodiment, the total confidence of a label is 1.0. If the example is decomposed into three dimensions, and two dimensions are labeled 'approve' (⅔)

and one dimension is labeled 'reject' ($1/3$), then it is assumed that the confidence of the majority label 'approve' is $2/3$ or 0.66 as a decimal value. In this case, the derived single label 404 that is assigned is "approve" with a confidence of 0.66 (where the confidence level is based on the label distribution of two "approve" labels and one "reject" label). The greater the number of subtasks that generate the "winning" label, the higher the confidence level.

In general, the consolidation function can be defined in, for example, the following ways:

1) majority vote strategy: the most common label provided by all subtasks is applied as the consolidated label 404 where, for example, the label distribution is used as a confidence measure;

2) weighted majority vote: majority vote strategy, as in 1), where subtasks are weighted based on, for example, domain knowledge (in the case of weighted dimensions, the confidence measure considers the weight of each dimension); and 3) consensus strategy: all subtasks must agree on the same label.

Figure 5A:
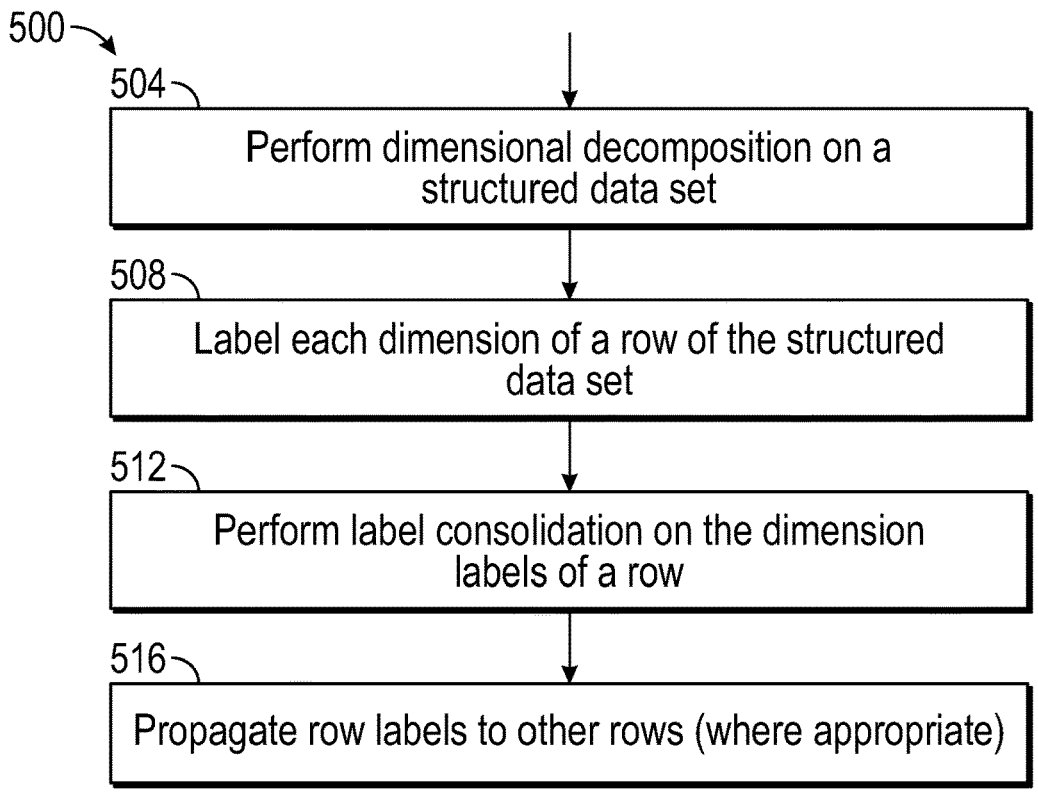
FIG. 5A is a flowchart for an example method for multi-dimensional data labeling, in accordance with an example embodiment.

FIG. 5A is a flowchart for an example method 500 for multi-dimensional data labeling, in accordance with an example embodiment. In one example embodiment, dimensional decomposition is performed to decompose each row R 340-1, 340-2, 340-3 of a data structure into a set of d data dimensions defining d labeling subtasks: $S_1, \ldots, S_d$ (operation 504). Derived subtask labeling is performed to generate label sets $L_1, \ldots, L_d$ by each derived label subtask $S_1, \ldots, S_d$ for each row $R_1, \ldots, R_N$ 340-1, 340-2, 340-3 (operation 508). Label consolidation is performed to determine a consolidated label $L^R$ 404 for each row $R_1, \ldots, R_N$ 340-1, 340-2, 340-3 as a function of the row's subtask labels $(L_1, \ldots, L_d)$ (operation 512). Row labels 404 are propagated to other rows 340-1, 340-2, 340-3 having similar data values (operation 516).

Figure 5B:
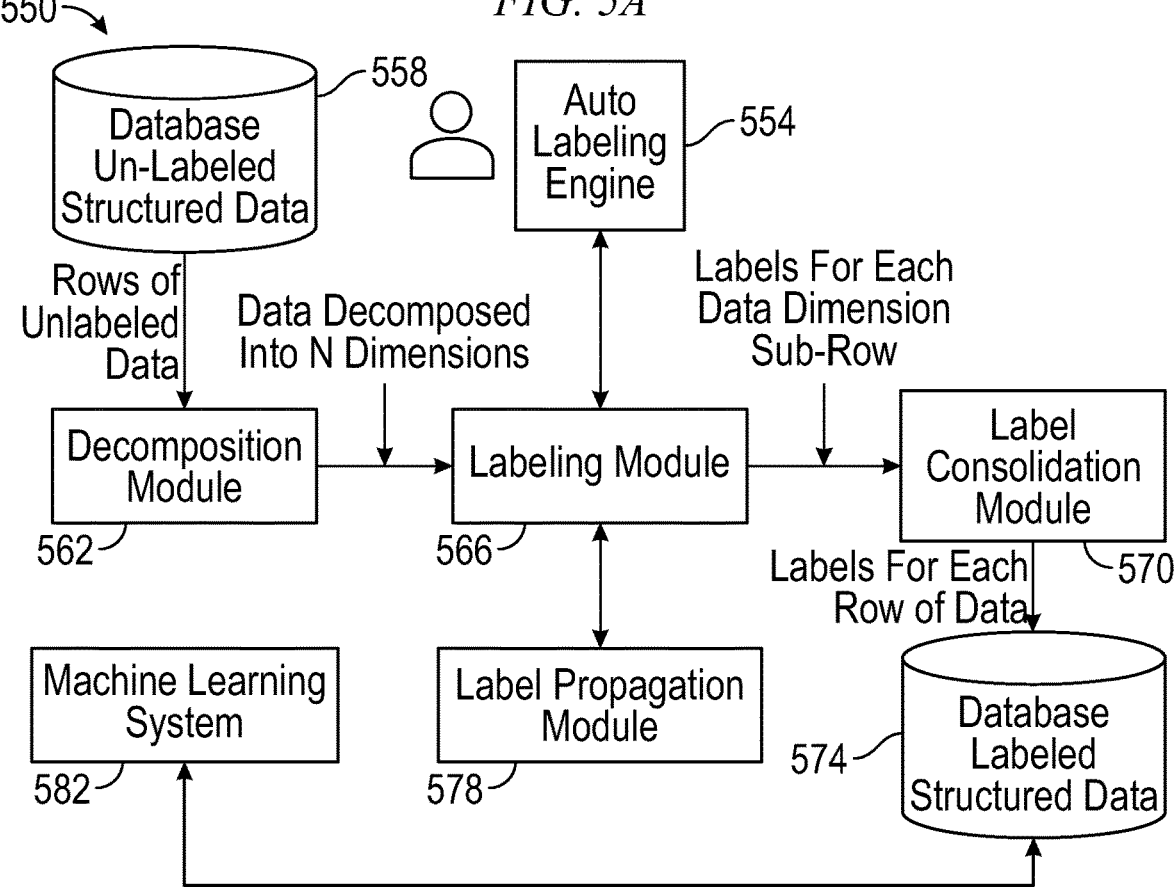
FIG. 5B is a block diagram for an example system for multi-dimensional data labeling, in accordance with an example embodiment.

FIG. 5B is a block diagram for an example system 550 for multi-dimensional data labeling, in accordance with an example embodiment. In one example embodiment, the system 550 includes an auto-labeling engine 554, an unlabeled structured database 558, a decomposition module 562, a labeling module 566, a label consolidation module 570, a label propagation module 578, and a labeled structured database 574. The unlabeled structured database 558 stores the structured data, such as the structured data set 100 of FIG. 1, prior to labeling.

In one example embodiment, the decomposition module 562 decomposes data attributes of the structured data set 100 into a set of dimensions using one of several techniques, such as clustering of attribute names/descriptions, grouping via correlation between attribute values, grouping based on user provided dimension weights, and the like. The decomposition may be performed fully automatically by the decomposition module 562 or may be performed manually by an expert. In one example embodiment, the decomposition module 562 suggests or recommends the decomposition results and the suggestions/recommendations are approved, modified by or rejected by a human expert.

In one example embodiment, the labeling module 566 selects unlabeled data dimension values (for a partial row) and presents them to either a human labeler or to the artificial intelligence (AI based) auto-labeling engine 554 to obtain at least one label for the given dimension. The labeling module 566 also interacts with the label propagation module 578 to replicate the obtained labels to identical or near identical partial rows on a per dimension basis.

The label consolidation module 570 combines labels from each dimension into one or more labels per row 340-1, 340-2, 340-3 based on various consolidation strategies, such as majority vote strategy, consensus strategy, and the like. As noted above, dimension weights may be considered when calculating the final labels. The labeled structured database 574 stores the structured data, such as the structured data set 100 of FIG. 1, after labeling.

In one example, the structured data set 100 may include data attributes related to financial transactions. A fraud model may be used to process the data attributes of each financial transaction and label the transaction as fraudulent or non-fraudulent (on a per row basis). A fraud expert may then utilize the system 550 to label the financial transactions as fraudulent or non-fraudulent. In particular, the decomposition module 562 decomposes the data attributes of the financial transactions into a set of dimensions and suggests or recommends the results to the fraud expert, who approves, modifies or rejects each suggestion/recommendation. The labeling module 566 selects unlabeled data dimension values (for a partial row) and presents them to the fraud expert to obtain at least one label for the given dimension. The labeling module 566 then interacts with the label propagation module 578 to replicate the obtained labels to identical or near identical partial rows on a per dimension basis. The label consolidation module 570 combines the fraud labels from each dimension into one or more labels per row 340-1, 340-2, 340-3. The trusted labels determined with the system 500 are then be compared to the labels derived by the fraud model to determine the accuracy of the fraud model in detecting fraudulent transactions.

In another example, a machine learning system 582 is trained based on the consolidated row label. An inference task is then performed using the trained machine learning system 582. Initially, a training dataset 100 for a machine learning system 582 is accessed. For example, a dataset 100 detailing historical demand for resources in a cloud computing environment over time may be obtained. An administrator may then utilize the system 550 to label each row 340-1, 340-2, 340-3 of the dataset 104 (where each row 340-1, 340-2, 340-3 corresponds to attributes of demand at a particular point in time) as leading to increased or decreased demand for resources in the future. In particular, the decomposition module 562 decomposes the data attributes of the historical demand into a set of dimensions and suggests or recommends the results to the administrator, who approves, modifies or rejects each suggestion/recommendation. The labeling module 566 selects unlabeled data dimension values (for a partial row) and presents them to the administrator to obtain at least one label for the given dimension. The labeling module 566 then interacts with the label propagation module 578 to replicate the obtained labels to identical or near identical partial rows on a per dimension basis. The label consolidation module 570 combines the labels from each dimension into one or more future demand labels per row 340-1, 340-2, 340-3. The future demand labels determined with the system 500 are then used with the historical demand dataset to train a machine learning system 582 to predict the future demand for the cloud computing environment.

Figures 6A, 6B:
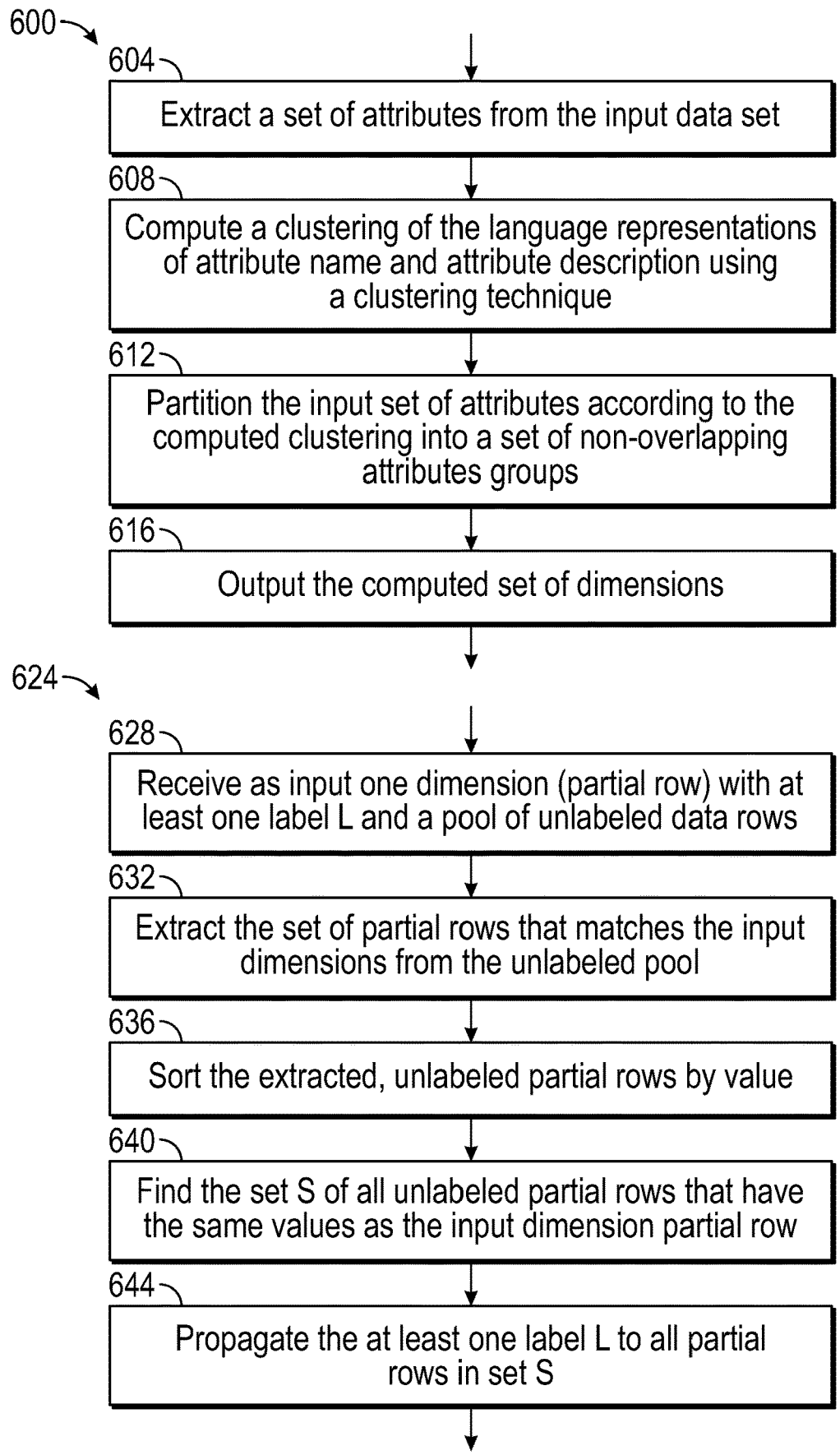
FIG. 6A is a flowchart for an example decomposition method for multi-dimensional data labeling, in accordance with an example embodiment.
FIG. 6B is a flowchart for an example label propagation method for multi-dimensional data labeling, in accordance with an example embodiment.

FIG. 6A is a flowchart for an example decomposition method 600 for multi-dimensional data labeling, in accordance with an example embodiment. In one example embodiment, a set of attributes are extracted from an input data set (operation 604). For example, the data attributes 302 (User, Card, Year, Month, Day, Time, Amount, Use_Chip, Is_Hold, Merchant_Name, Merchant_City, Merchant_State, Zip, MCC, Is_Flight, Year_1, Month_1, Day_1, Flt1_Src_Airp, Flt1_Dest_Airp, Flt2_Src_Airp, and Flt2_Dest_Airp) may be extracted. A clustering of the language representations of attribute name and attribute description are computed using a clustering technique (operation 608). The input set of attributes is partitioned according to the computed clustering into a set of non-overlapping attributes groups, such as the transaction details dimension 308 (User, Card, Year, Month, Day, Time, and Amount), the security details dimension 312 (Use_Chip and Is_Hold), the merchant dimension 316 (Merchant_Name, Merchant_City, Merchant_State, Zip, and MCC), and the flight dimension 320 (Is_Flight, Year_1, Month_1, Day_1, Flt1_Src_Airp, Flt1_Dest_Airp, Flt2_Src_Airp, and Flt2_Dest_Airp) (operation 612). The computed set of dimensions are output (operation 616). (Clustering is only one of several options for computing the decomposition; other options are described elsewhere herein, for example.)

FIG. 6B is a flowchart for an example label propagation method 624 for multi-dimensional data labeling, in accordance with an example embodiment. In one example embodiment, one dimension (partial row) is received as input with at least one label L and a pool of unlabeled data rows (operation 628). The set of partial rows that matches the input dimensions is extracted from the unlabeled pool (operation 632). The extracted, unlabeled partial rows are sorted by value (operation 636). The set S of all unlabeled partial rows that have the same values as the input dimension partial row are found (operation 640). The at least one label L is propagated to all partial rows in the set S (operation 644).

Figure 6C:
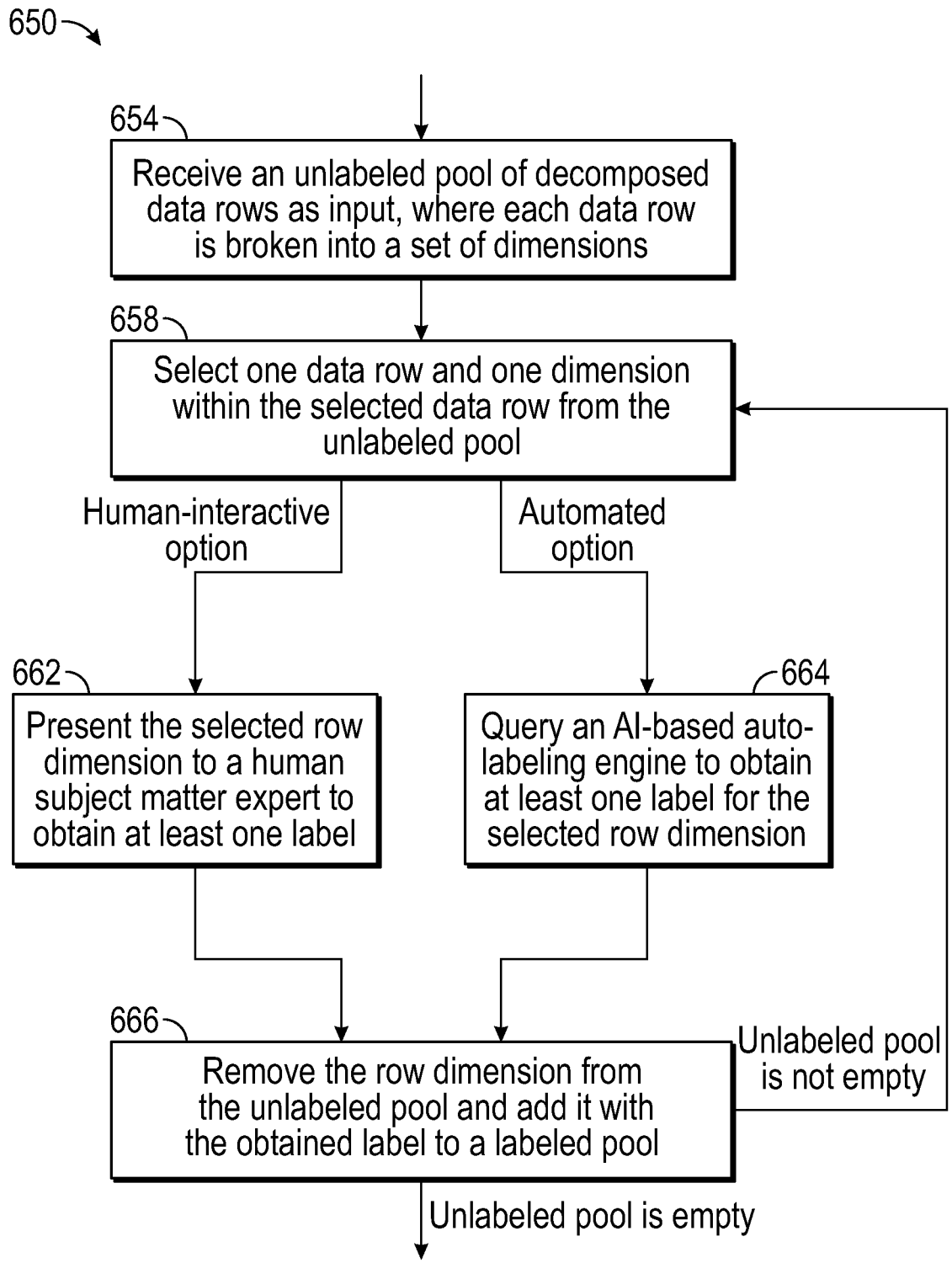
FIG. 6C is a flowchart for an example labeling method for multi-dimensional data labeling, in accordance with an example embodiment.

FIG. 6C is a flowchart for an example labeling method 650 for multi-dimensional data labeling, in accordance with an example embodiment. In one example embodiment, an unlabeled pool of decomposed data rows is received as input, where each data row is broken into a set of dimensions (operation 654). For example, the set of dimensions may be identified by the decomposition method 600 of FIG. 6A. One data row and one dimension within the selected data row are selected from the unlabeled pool (operation 658). If the human-interactive mode is being utilized, the selected row dimension is presented to a human subject matter expert to obtain at least one label (operation 662); otherwise, an AI-based auto-labeling engine, such as the auto-labeling engine 554, is queried to obtain at least one label for the selected row dimension (operation 664). Following operation 662 or operation 664, the row dimension is removed from the unlabeled pool and it is added with the obtained label to a labeled pool (operation 666). If the unlabeled pool is empty, the method 650 ends; otherwise, the method 650 proceeds with operation 658.

Figure 6D:
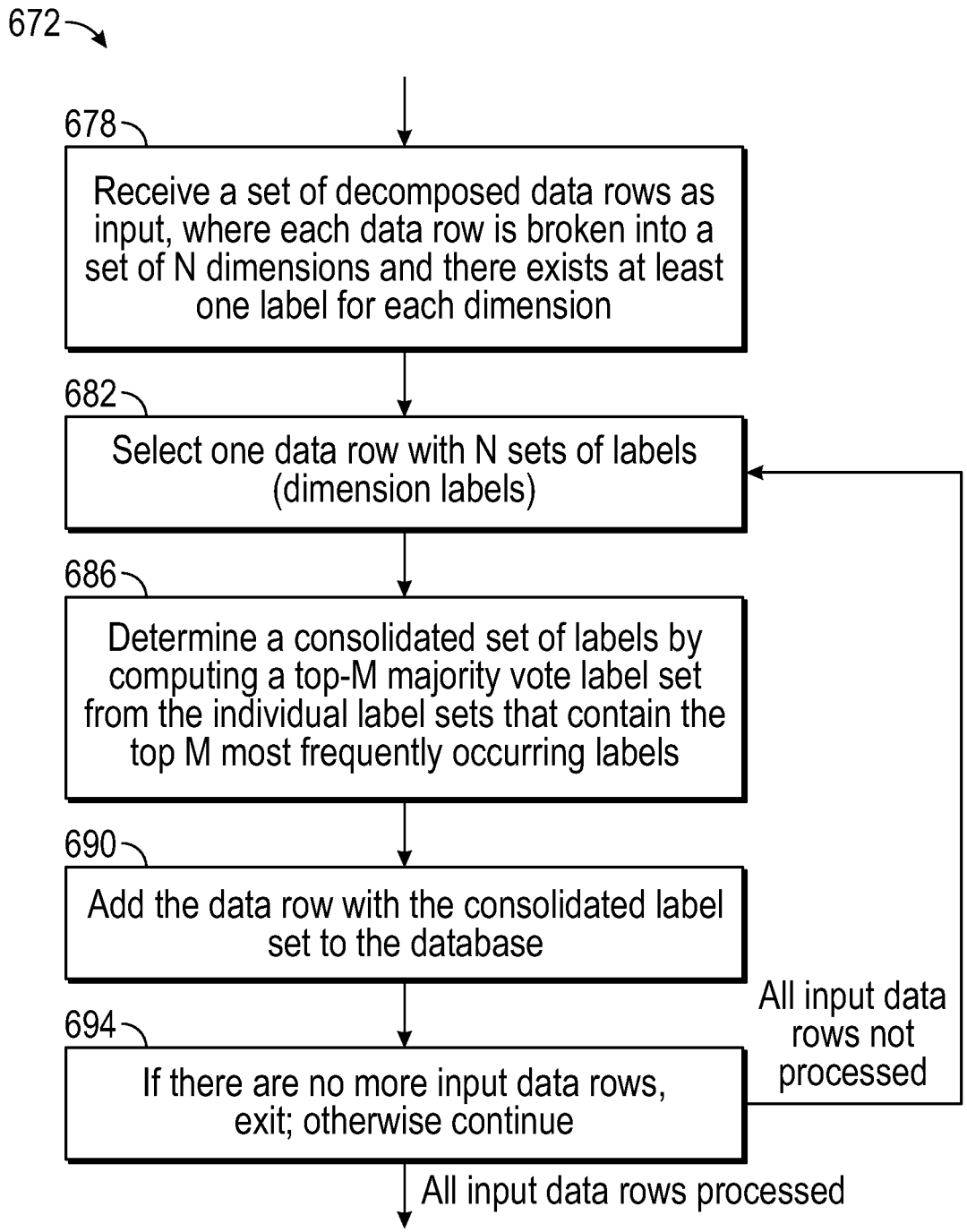
FIG. 6D is a flowchart for an example label consolidation method for multi-dimensional data labeling, in accordance with an example embodiment.

FIG. 6D is a flowchart for an example label consolidation method 672 for multi-dimensional data labeling, in accordance with an example embodiment. In the example embodiment of FIG. 6D, a majority vote strategy is utilized; however, as described elsewhere herein, other consolidation strategies are contemplated. Initially, a set of decomposed data rows is received as input, where each data row is broken into a set of N dimensions and there exists at least one label for each dimension (operation 678). One data row with N sets of labels (dimension labels) is selected (operation 682). A consolidated set of labels is determined by computing a top-M majority vote label set from the individual label sets that contain the top M most frequently occurring labels (operation 686). The data row and the consolidated label set are added to the labeled structured database 574 (operation 690). If all input data rows have been processed, the method 672 ends; otherwise, the method 672 proceeds with operation 682.

In general, the above techniques improve label quality via, for example, decomposition. Better quality labels generally equate to a better trained (more accurate) model, thus improving the technological process of training a machine learning system 582 and then using it for inferencing. Furthermore, if the learning algorithm supports weighted labels or soft labels (label as a distribution), then both types of output are facilitated, again equating to enhanced model accuracy.

It is worth noting that in one or more embodiments, a purpose of the "generation of clusters of data attributes" is to partition the complex labeling tasks into sets of less complex labeling subtasks (the "divide" or "map" step in a "divide & conquer" or "map-reduce" approach). The matching "conquer" or "reduce" step includes the consolidation where labels for the subtasks are combined. Furthermore, "automatic propagation" is an optional optimization step—the system could function with only clustering and label consolidation, if desired.

Given the discussion thus far, it will be appreciated that, in general terms, an exemplary method, according to an aspect of the invention, includes the operations of obtaining, using at least one hardware processor (e.g., 16 discussed elsewhere herein), a structured data set 100 having a plurality of rows, the structured data set 100 comprising a set of data attributes 302, each data attribute 302 having a data value for each of the plurality of rows 340-1, 340-2, 340-3 of the structured data set 100. This step can be implemented, for example, via a relation or other database 558 implemented via the hardware processor. A further step includes decomposing (e.g., using decomposition module 562) the structured data set 100 into a plurality of dimensions 308, 312, 316, 320, each dimension 308, 312, 316, 320 defining a proper subset of the data attributes 302 based on at least one coherence criterion. A still further step includes obtaining a dimension label 310, 314, 318, 322 for each dimension 308, 312, 316, 320 of at least a portion of the plurality of rows 340-1, 340-2, 340-3 of the structured data set 100. This can be done, for example, by a human SME (manually or assisted by the labeling module 566), or automatically by the labeling module 566. An even further step includes consolidating, using the at least one hardware processor, the dimension labels 310, 314, 318, 322 for a given one of the rows 340-1, 340-2, 340-3 of the structured data set 100 into at least one row label 404 for the given one of the rows 340-1, 340-2, 340-3. This can be done, for example, automatically by the label consolidation module 570. In some instances, the human user manually configures some options regarding how the labels are merged, within the automated process.

Furthermore, regarding the decomposition step, generally, this can be done automatically, via clustering/correlation analysis with decomposition module 562; manually by a human data owner, such as the user selecting columns; or in an assisted manner wherein decomposition module 562 assists the human user—for example, the user reviews the module's suggestions and confirms that they are acceptable or modifies the suggestion.

In one aspect, a computer program product for multi-dimensional data labeling comprises a computer readable storage medium having program instructions embodied therewith, the program instructions executable by a computer to cause the computer to obtain a structured data set 100 having a plurality of rows, the structured data set 100 comprising a set of data attributes 302, each data attribute 302 having a data value for each of the plurality of rows 340-1, 340-2, 340-3 of the structured data set 100; decompose the structured data set 100 into a plurality of dimensions 308, 312, 316, 320, each dimension 308, 312, 316, 320 defining a proper subset of the data attributes 302 based on at least one coherence criterion; obtain a dimension label 310, 314, 318, 322 for each dimension 308, 312, 316, 320 of at least a portion of the plurality of rows 340-1, 340-2, 340-3 of the structured data set 100; and consolidate the dimension labels 310, 314, 318, 322 for a given one of the rows 340-1, 340-2, 340-3 of the structured data set 100 into at least one row label 404 for the given one of the rows 340-1, 340-2, 340-3. In one example embodiment, the computer program product is non-transitory.

In one aspect, an apparatus comprises a memory and at least one processor, coupled to said memory, and operative to perform operations comprising obtaining a structured data set 100 having a plurality of rows, the structured data set 100 comprising a set of data attributes 302, each data attribute 302 having a data value for each of the plurality of rows 340-1, 340-2, 340-3 of the structured data set 100; decomposing the structured data set 100 into a plurality of dimensions 308, 312, 316, 320, each dimension 308, 312, 316, 320 defining a proper subset of the data attributes 302 based on at least one coherence criterion; obtaining a dimension label 310, 314, 318, 322 for each dimension 308, 312, 316, 320 of at least a portion of the plurality of rows 340-1, 340-2, 340-3 of the structured data set 100; and consolidating the dimension labels 310, 314, 318, 322 for a given one of the rows 340-1, 340-2, 340-3 of the structured data set 100 into at least one row label 404 for the given one of the rows 340-1, 340-2, 340-3.

In one example embodiment, the decomposition of the structured data set 100 into the plurality of dimensions 308, 312, 316, 320 further comprises performing an attribute correlation analysis. In one example embodiment, the consolidation is based on a majority vote. In one example embodiment, the consolidation further comprises generating a confidence measure based on a label distribution. In one example embodiment, the consolidation is based on a weighted majority vote and wherein the consolidation of the dimension labels is based on a weight assigned to each of a plurality of labeling subtasks. In one example embodiment, the consolidation is based on a consensus strategy wherein the at least one row label 404 is based on a label agreement by all of the dimension labels 310, 314, 318, 322. It will be appreciated that typically, a label is obtained for every dimension for a particular row. A consolidation strategy can be used, for example, to come up with a final label. An ML model may require only one label for a particular row. However, in some instances, there can be a set of labels for the row. For example, there are multi-label problems. In some cases, there may be a set of labels for every dimension from different labelers, or from the same labeler. It is often desired to reduce these to one label for the row. However, in some cases, there can be one or more final labels for the row that are obtained by consolidating out of all the labels for each dimension or via iteration, for example.

In one example embodiment, a dimension label 310, 314, 318, 322 of one row 340-1, 340-2, 340-3 of the at least a portion of the plurality of rows of the structured data set 100 is propagated to a similar dimension value of another row 340-1, 340-2, 340-3 of the structured data set 100. In one example embodiment, a row label 404 of one row 340-1, 340-2, 340-3 of the structured data set 100 is propagated to another row 340-1, 340-2, 340-3 of the structured data set 100. For example, in this aspect, an ML model has already been trained and a body of labeled data is available. The ML model is being used in production; for example, a fraud detection model is based on the labeled fraud data. A number of transactions are periodically fed into the fraud detection model which makes a classification FRAUD/NO FRAUD. It is not certain that these predictions are correct. The accuracy of the model is assessed occasionally. For example, manually label a number of production transactions and compare them to the predicted labels. In essence, a test set has been created out of the production data. Then, it is possible to evaluate the accuracy of the predictor. Instead of manual labeling, embodiments of the invention can be used to do the labeling. The deployed model could be updated based on performance on the test data. Security action(s) could be initiated and carried out based on the updated model. In one example embodiment, at least one row label identifies a fraud classification of a transaction corresponding to the given one of the rows; and an accuracy of a fraud model is determined based on the at least one row label.

In one example embodiment, a machine learning system 582 is trained based on the consolidated row label. In one example embodiment, an inference task is performed using the trained machine learning system 582. In one example embodiment, the decomposition step is assisted via partitioning of attribute names and descriptions. In one example embodiment, the decomposition step is assisted via grouping of correlated attributes. In one example embodiment, the decomposition step is performed automatically by the label consolidation module 570 and the obtaining the dimension label for each dimension is performed automatically by the labeling module 566 and the auto-labeling engine 554.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7A:
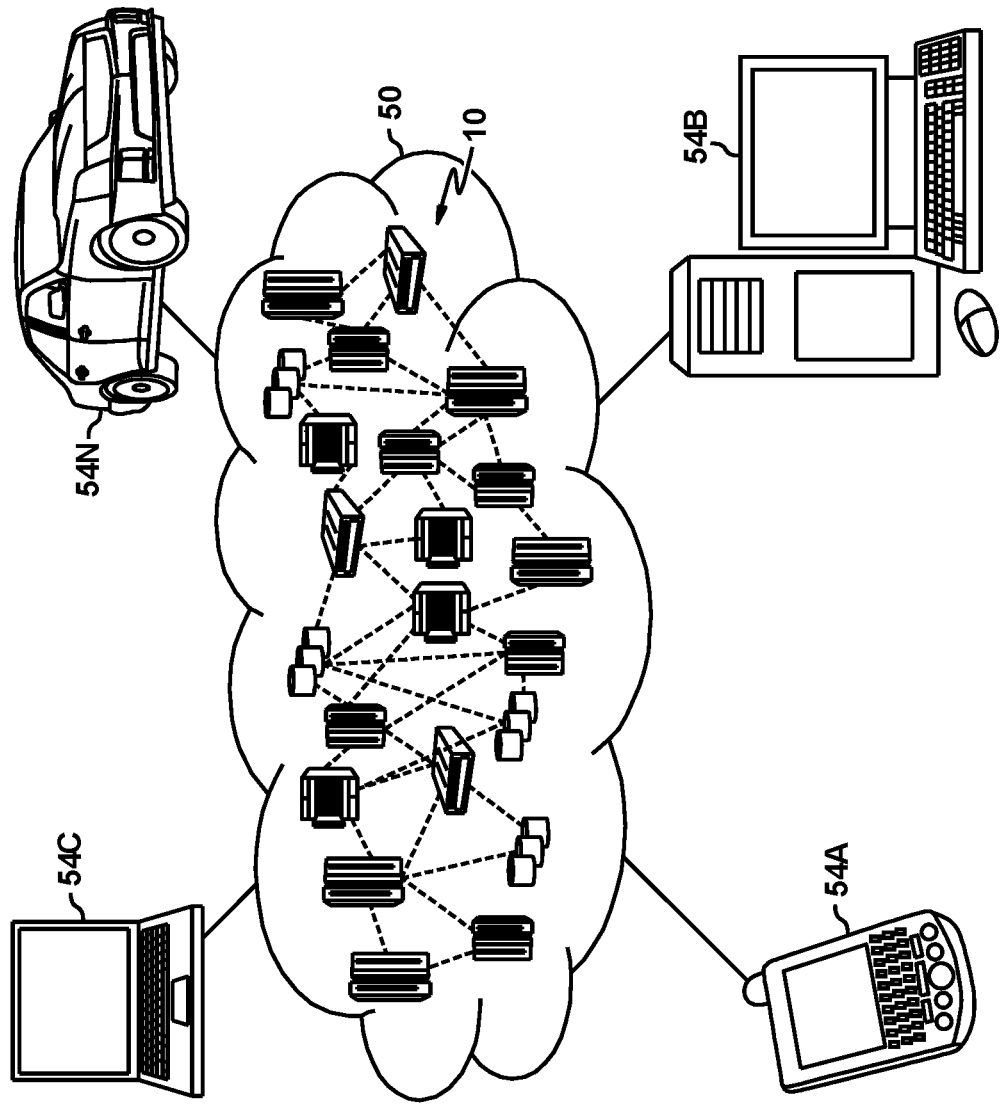
FIG. 7A depicts a cloud computing environment according to an embodiment of the present invention.

Referring now to FIG. 7A, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7A are intended to be illustrative only and that computing nodes 10 and cloud computing environment 50 can communicate with any type of computerized device over any type of network and/or network addressable connection (e.g., using a web browser).

Figure 7B:
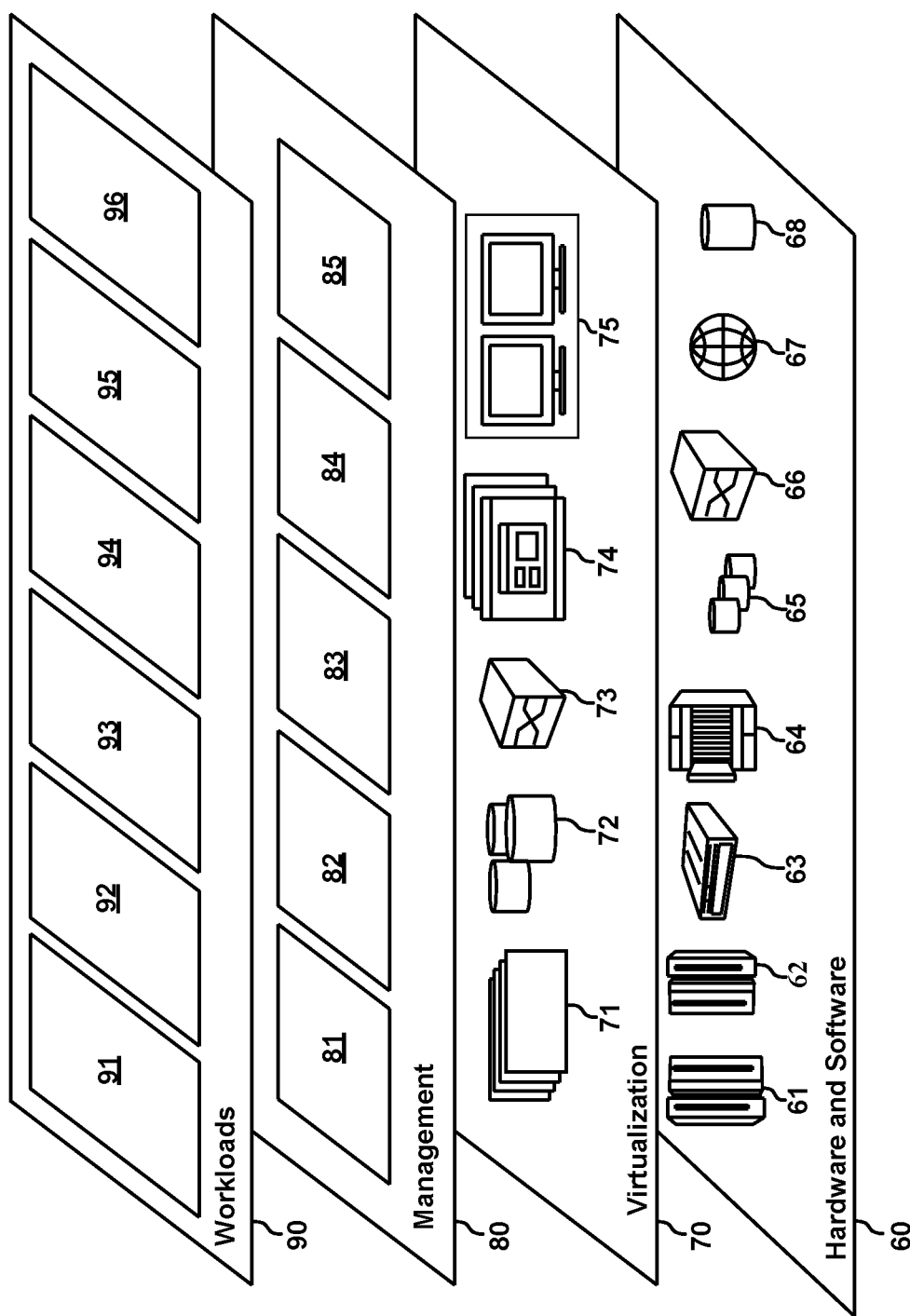
FIG. 7B depicts abstraction model layers according to an embodiment of the present invention.

Referring now to FIG. 7B, a set of functional abstraction layers provided by cloud computing environment 50 (FIG. 7A) is shown. It should be understood in advance that the components, layers, and functions shown in FIG. 7B are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and at least a portion of a multi-dimensional data labeling tool 96 (for example, in one embodiment, the entire tool except for a labeling user interface is cloud-implemented—other embodiments could be implemented outside the cloud or partially in the cloud).

Figure 8:
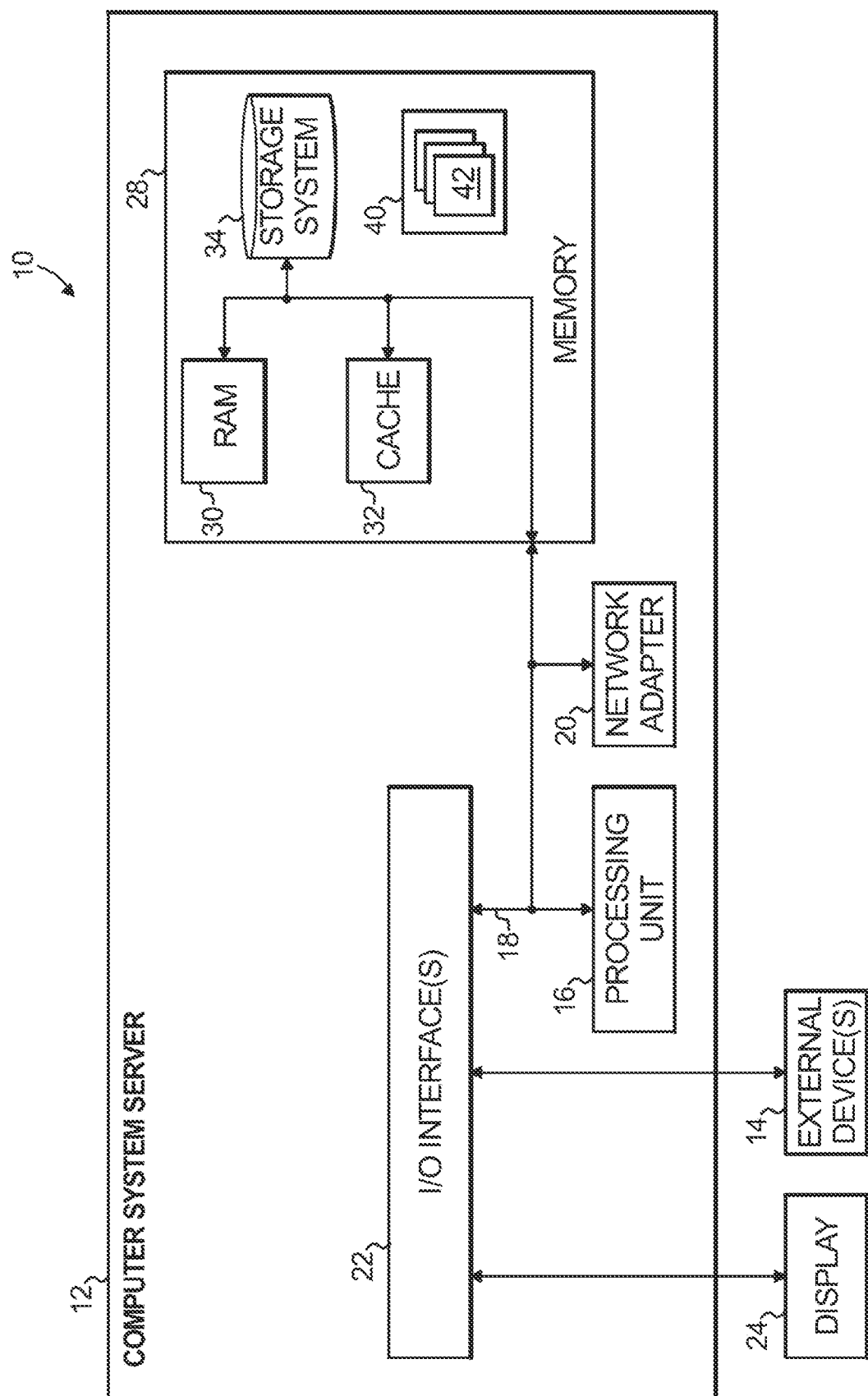
FIG. 8 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 6-7 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
obtaining, using at least one hardware processor, a structured data set having a plurality of rows, the structured data set comprising a set of data attributes, each data attribute having a data value for each of the plurality of rows of the structured data set;
decomposing the structured data set into a plurality of dimensions, each dimension defining a proper subset of the data attributes based on at least one coherence criterion;
obtaining a dimension label for each dimension of at least a portion of the plurality of rows of the structured data set; and
consolidating, using the at least one hardware processor, the dimension labels for a given one of the rows of the structured data set into at least one row label for the given one of the rows.

2. The method of claim 1, wherein the decomposition of the structured data set into the plurality of dimensions further comprises performing an attribute correlation analysis.

3. The method of claim 1, wherein the consolidation is based on a majority vote by a majority of subtasks.

4. The method of claim 3, wherein the consolidation further comprises generating a confidence measure based on a label distribution.

5. The method of claim 1, wherein the consolidation is based on a weighted majority vote and wherein the consolidation of the dimension labels is based on a weight assigned to each of a plurality of labeling subtasks.

6. The method of claim 1, wherein the consolidation is based on a consensus strategy wherein the at least one row label is based on a label agreement by all of the dimension labels.

7. The method of claim 1, the method further comprising propagating a dimension label of one row of the at least a portion of the plurality of rows of the structured data set to a similar dimension value of another row of the structured data set.

8. The method of claim 1, wherein the at least one row label identifies a fraud classification of a transaction corresponding to the given one of the rows; and the method further comprises determining an accuracy of a fraud model based on the at least one row label.

9. The method of claim 1, further comprising training a machine learning system based on the consolidated row label.

10. The method of claim 9, further comprising performing an inference task using the trained machine learning system.

11. The method of claim 1, wherein the decomposition step is assisted via partitioning of attribute names and descriptions.

12. The method of claim 1, wherein the decomposition step is assisted via grouping of correlated attributes.

13. The method of claim 1, wherein the decomposition step is performed automatically by the label consolidation module and the obtaining the dimension label for each dimension is performed automatically by the labeling module and the auto-labeling engine.

14. A computer program product for multi-dimensional data labeling, the computer program product comprising a computer readable storage medium having program instructions embodied therewith, the program instructions executable by a computer to cause the computer to:

obtain a structured data set having a plurality of rows, the structured data set comprising a set of data attributes, each data attribute having a data value for each of the plurality of rows of the structured data set;

decompose the structured data set into a plurality of dimensions, each dimension defining a proper subset of the data attributes based on at least one coherence criterion;

obtain a dimension label for each dimension of at least a portion of the plurality of rows of the structured data set; and consolidate the dimension labels for a given one of the rows of the structured data set into at least one row label for the given one of the rows.

15. The computer program product of claim 14, wherein the at least one row label identifies a fraud classification of a transaction corresponding to the given one of the rows; and the program instructions executable by a computer further cause the computer to determine an accuracy of a fraud model based on the at least one row label.

16. An apparatus comprising:
a memory; and
at least one processor, coupled to said memory, and operative to perform operations comprising:

obtaining a structured data set having a plurality of rows, the structured data set comprising a set of data attributes, each data attribute having a data value for each of the plurality of rows of the structured data set;

decomposing the structured data set into a plurality of dimensions, each dimension defining a proper subset of the data attributes based on at least one coherence criterion;

obtaining a dimension label for each dimension of at least a portion of the plurality of rows of the structured data set; and consolidating the dimension labels for a given one of the rows of the structured data set into at least one row label for the given one of the rows.

17. The apparatus of claim 16, wherein the decomposition of the structured data set into the plurality of dimensions further comprises performing an attribute correlation analysis.

18. The apparatus of claim 16, wherein the consolidation is based on a weighted majority vote and wherein the consolidation of the dimension labels is based on a weight assigned to each of a plurality of labeling subtasks.

19. The apparatus of claim 16, wherein the consolidation is based on a consensus strategy wherein the at least one row label is based on a label agreement by all of the dimension labels.

20. The apparatus of claim 16, the operations further comprising propagating a dimension label of one row of the at least a portion of the plurality of rows of the structured data set to a similar dimension value of another row of the structured data set.

* * * * *